(12) United States Patent
Hou (10) Patent No.: US 10,976,074 B2
(45) Date of Patent: Apr. 13, 2021

(54) SAFE WATER HEATER

(71) Applicant: Xiamen Cheari Eco Technology Co., Ltd, Xiamen (CN)

(72) Inventor: Quanduo Hou, Xiamen (CN)

(73) Assignee: XIAMEN CHEARI ECO TECHNOLOGY CO., LTD, Xiamen (CN)

( * ) Notice: Subject to any disclaimer, the term of this patent is extended or adjusted under 35 U.S.C. 154(b) by 97 days.

(21) Appl. No.: 16/512,391

(22) Filed: Jul. 16, 2019

(65) Prior Publication Data

US 2020/0408444 A1    Dec. 31, 2020

(30) Foreign Application Priority Data

Jun. 27, 2019   (CN) .......................... 201910565425.X (51) Int. Cl.
   *F22B 37/47*   (2006.01)
   *F24H 9/16*    (2006.01)
   *F24H 1/18*    (2006.01)

(52) U.S. Cl.
   CPC ............. *F24H 9/165* (2013.01); *F24H 1/181* (2013.01)

(58) Field of Classification Search
   CPC ....... F22B 37/42; F22B 37/475; F22B 37/423
   See application file for complete search history.

(56) References Cited

U.S. PATENT DOCUMENTS

| 1,821,699 | A | * | 9/1931 | Fleck | F22B 37/42 200/81.5 |
| 2,001,686 | A | * | 5/1935 | Moore | F22B 37/475 122/504.1 |
| 3,530,837 | A | * | 9/1970 | Olney | F22B 37/42 122/504 |
| 3,831,561 | A | * | 8/1974 | Yamamoto | F22B 37/42 122/379 |
| 6,820,637 | B1 | * | 11/2004 | Vertanen | F01P 3/20 137/340 |

FOREIGN PATENT DOCUMENTS

GB    872662 A  *  7/1961  ............. G01F 23/60

* cited by examiner

*Primary Examiner* — Gregory A Wilson (57) ABSTRACT

A safe water heater comprises a housing assembly, a box assembly, and a water inlet and outlet assembly. The housing assembly comprises a first housing with a mounting cavity. The box assembly comprises a water tank with a water-containing cavity. The water inlet and outlet assembly comprises a water inlet subassembly and a water outlet subassembly. The water inlet subassembly comprises a second water inlet pipe communicating with the water-containing cavity, a first water inlet pipe able to communicate with outside, and a leak-proof mechanism. The leak-proof mechanism is capable of sealing a water inlet of the second water inlet pipe.

10 Claims, 6 Drawing Sheets

SAFE WATER HEATER

CROSS REFERENCE TO RELATED APPLICATION

This application claims all benefits accruing under 35 U.S.C. § 119 from China Patent Application No. 201910565425.X, filed on Jun. 27, 2019, in the State Intellectual Property Office, the disclosure of which is hereby incorporated by reference in its entirety.

TECHNICAL FIELD

This disclosure relates to the technical field of water heater, and more particularly to a safe water heater.

BACKGROUND ART

Water heaters are a common household device, generally installed in bathrooms to provide people with hot water for showering and so on.

Most existing water heaters have no leak-proof function, and once the water heaters leak water, it is likely to cause great economic losses to consumers, and even lead to security incidents. Consumers can monitor water heaters and control closing of the water valves of the water heaters by wireless communicating technology. However, water heaters, which rely on wireless communication, have to be connected to electricity at all times and would stop working properly after electric power failure, and the cost of relying on wireless communication is high.

SUMMARY

The present disclosure provides a safe water heater, which is intended to solve the problem of water heaters having no leak-proof function in the existing technology.

In order to solve the technical problem, the present disclosure provides a safe water heater, comprising a housing assembly comprising a first housing with a built-in mounting cavity, a box assembly comprising a water tank located in the mounting cavity with a built-in water-containing cavity, and a water inlet and outlet assembly comprising a water inlet subassembly and a water outlet subassembly. The water outlet subassembly comprises a water outlet pipe communicating with the water-containing cavity. The water inlet subassembly comprises a second water inlet pipe communicating with the water-containing cavity, a first water inlet pipe able to communicate with outside, and a leak-proof mechanism used to communicate with the first water inlet pipe and the second water inlet pipe. The leak-proof mechanism comprises a tube with a built-in moving channel, a moving part movably arranged in the moving channel, a limit part arranged at the tube and sealing one end of the moving channel, an elastic part sleeved at the moving part, a revolving part hinged with the moving part, and an expansion part supported in the mounting cavity and connected with the revolving part.

The revolving part can be supported at the limit part to make the second water inlet pipe and the first water inlet pipe communicate with the moving channel. The expansion part can expand in water and drive the revolving part to rotate to make the elastic part drive the moving part to move forward and seal the water inlet of the second water inlet pipe to disconnect the second water inlet pipe from the moving channel.

In some embodiments, the revolving part has a limit section used to be supported at the limit part, and a driving section connected with the expansion part which can drive the driving section to rotate upwards and lead the limit section to rotate downwards to separate the limit section from the limit part.

In some embodiments, the front end of the moving part is sleeved with a first seal which is matched with the water inlet of the second water inlet pipe.

In some embodiments, the first housing is provided with a mounting seat which is disposed at the bottom of the mounting cavity and provided with a first channel communicating with the mounting cavity, and the expansion part is disposed at the mounting seat.

In some embodiments, the height L between the expansion part and the bottom wall of the mounting cavity is 3 mm to 10 mm.

In some embodiments, the first housing is provided with a drainage outlet which is located under the expansion part.

In some embodiments, the water outlet pipe has an extended segment which extends into the water-containing cavity and upwards along the water-containing cavity, and a water outlet segment which extends out of the water tank.

In some embodiments, the box assembly comprises a water rotated part disposed in the mounting cavity and located at the water outlet of the second water inlet pipe, and the water rotated part has a water rotated blade which is horizontally arranged and a baffle plate which is vertically arranged.

In some embodiments, the water heater comprises a control mechanism comprising a printed circuit board ("PCB") plate located in the mounting cavity and disposed at the first housing, and the first housing is provided with a division plate to separate the PCB plate from the box assembly.

In some embodiments, the PCB plate has a cooling fin connected with the limit part. The control mechanism comprises a flow sensor and a water inlet temperature sensor disposed at the water inlet subassembly, and a water outlet temperature sensor disposed at the water outlet pipe. The flow sensor, the water inlet temperature sensor as well as the water outlet temperature sensor are electrically connected with the PCB plate.

The water heater of the present disclosure has advantage of resisting leakage.

When the water heater is not leaking, water from the outside enters the moving channel through the first water inlet pipe, gets into the second water inlet pipe through the moving channel, and lastly arrives at the water-containing cavity of the water tank to be heated. The heated water can be discharged from the water outlet pipe for use. When the water heater is not leaking, the revolving part is supported at the limit part to keep the elastic part in compression and prevent the limit part from moving forward. At the same time, the second water inlet pipe and the first water inlet pipe are communicating with the moving channel.

When the water heater is leaking, the leaking water accumulates at the bottom of the mounting cavity, and when the accumulated water reaches a certain amount, the expansion part would be soaked, and then expand to drive the revolving part to rotate and separate from the limit part. Now the compressed elastic part would drive the moving part to move forward and seal the water inlet of the second water inlet pipe to disconnect the second water inlet pipe from the moving channel. Now only the first water inlet pipe is communicating with the moving channel, and the water-containing cavity cannot communicate with the outside through the second water inlet pipe, so that the outside water cannot enter the water-containing cavity anymore.

When the water heater is leaking, the water heater of the present disclosure would be disconnected with outside, and the outside water cannot enter the water-containing cavity as a good leak-proof function. Moreover, the leak-proof mechanism of the present disclosure does not need electric power, and as such the leak-proof mechanism works well after electric power failure.

BRIEF DESCRIPTION OF THE DRAWINGS

The embodiments of the disclosure will become apparent and more readily appreciated from the following description of the embodiments, taken in conjunction with the accompanying drawings. It should be understood that the following drawings merely show certain embodiments of the disclosure and therefore should not be considered as limit to the scope of the disclosure. For those skilled in the art, other related drawings may also be obtained based on these drawings without any creative work. In the accompanying drawings.

DETAILED DESCRIPTION

The technical solutions in the embodiments of the present disclosure will be clearly and completely described in conjunction with the drawings of the embodiments of the present disclosure. Apparently, what is described are some but not all of the embodiments of the present disclosure. All other embodiments obtained by a person of ordinary skill in the art based on the embodiments of the present disclosure without creative efforts are within the scope of the present disclosure. Therefore, the following detailed description of the embodiments of the present disclosure are not intended to limit the scope of the present disclosure, but to explain the selected embodiments of the present disclosure. All other embodiments obtained by a person of ordinary skill in the art based on the embodiments of the present disclosure without creative efforts are within the scope of the present disclosure.

In the description of the present disclosure, it is to be understood that the orientational or positional relationships indicated by the terms "center", "longitudinal", "transversal", "length", "width", "thickness", "upper", "lower", "front", "rear", "left", "right", "vertical", "horizontal", "top", "bottom", "inside", "outside", "clockwise", "counterclockwise", etc. are based on the orientation or positional relationship shown in the drawings, are merely for the convenience of describing the present disclosure and simplifying the description, and do not indicate or imply that the device or component referred to must have a specific orientation or be constructed and operated in a specific orientation. Therefore, it should not be construed as limiting the present disclosure.

Moreover, the terms "first" and "second" are used for descriptive purposes only and are not to be construed as indicating or implying a relative importance or implicitly indicating the number of technical features indicated. Thus, features defining "first" and "second" may include one or more of the features either explicitly or implicitly. In the description of the present disclosure, the meaning of "a plurality" is two or more unless specifically defined otherwise.

In the present disclosure, the terms "install", "connected", "connect", "fix" and the like shall be understood broadly. For example, the connection may be a fixed connection or a detachable connection or integration; may be a mechanical connection or an electrical connection; may be directly connected, may be indirectly connected through an intermediate medium, or may be an internal communication of two elements or the interaction of two elements, unless explicitly stated and defined otherwise. For those skilled in the art, the specific meanings of the above terms in the present disclosure can be understood based on specific situations.

In the present disclosure, when a first feature is described to be "on" or "under" a second feature, situations may include direct contact of the first and second features, and may also include indirect contact of first and second features through another feature therebetween, unless otherwise specifically defined and defined. Moreover, when a first feature is described to be "over", "above" and "on" the second feature, situations include that the first feature is directly not directly above the second feature, or that the first feature is merely located higher than the second feature. When a first feature is described to be "under", "below" and "down" the second feature, situations include that the first feature is directly or not directly below the second feature, or that the first feature is merely located lower than the second feature.

The present disclosure will be further described in detail below with reference to the accompanying drawings and specific embodiments.

As illustrated in FIG. 1 to FIG. 5, the embodiment provides a safe water heater comprising a housing assembly 1 comprising a first housing 14 with a built-in mounting cavity 15, a box assembly 2 comprising a water tank 5 located in the mounting cavity 15 with a built-in water-containing cavity 6, and a water inlet and outlet assembly 3 comprising a water inlet subassembly 8 and a water outlet subassembly 7. The water outlet subassembly 7 comprises a water outlet pipe 23 communicating with the water-containing cavity 6. The water inlet subassembly 8 comprises a second water inlet pipe 9 communicating with the water-containing cavity 6, a first water inlet pipe 10 able to be communicate with outside, and a leak-proof mechanism 11 used to communicate with the first water inlet pipe 10 and the second water inlet pipe 9. The leak-proof mechanism 11 comprises a tube 29 with a built-in the moving channel 38, a moving part 31 movably arranged in the moving channel 38, a limit part 30 arranged at the tube 29 and sealing one end of the moving channel 38, an elastic part 28 sleeved at the moving part 31, a revolving part 33 hinged with the moving part 31, and an expansion part 34 supported in the mounting cavity 15 and connected with the revolving part 33.

The revolving part 33 can be supported at the limit part 30 to make the second water inlet pipe 9 and the first water inlet pipe 10 communicate with the moving channel 38. The expansion part 34 can expand in water and drive the revolving part 33 to rotate to make the elastic part 28 drive the moving part 31 to move forward and seal the water inlet of the second water inlet pipe 9 to disconnect the second water inlet pipe 9 from the moving channel 38. Specifically, the operating principle of the water heater of the disclosure is as follows.

Figure 5:
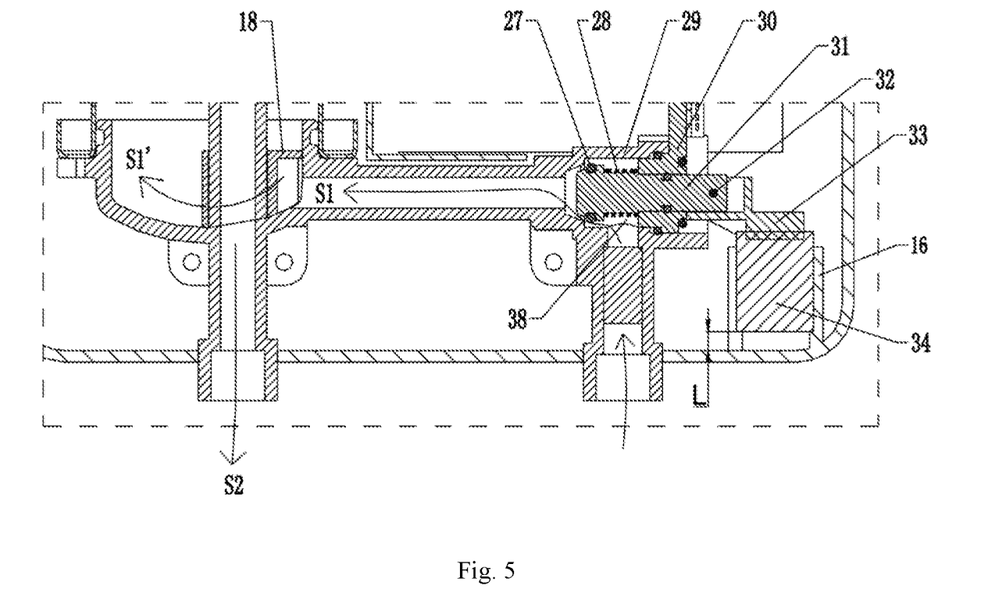
FIG. 5 is a partially enlarged view of selected portion V shown in FIG. 3.

As illustrated in FIG. 5, when the water heater is not leaking, water from outside would enter the moving channel 38 through the first water inlet pipe 10, enter into the second water inlet pipe 9 through the moving channel 38, and lastly arrive at the water-containing cavity 6 of the water tank 3 to be heated in the S1-direction, and the heated water can be discharged from the water outlet pipe 23 in the S2-direction for use. Moreover, when the water heater is not leaking, the revolving part 33 is supported at the limit part 30 to keep the elastic part 28 in compression and make the limit part 30 fail to move forward. At the same time, the second water inlet pipe 9 and the first water inlet pipe 10 communicate with the moving channel 38.

Figure 6:
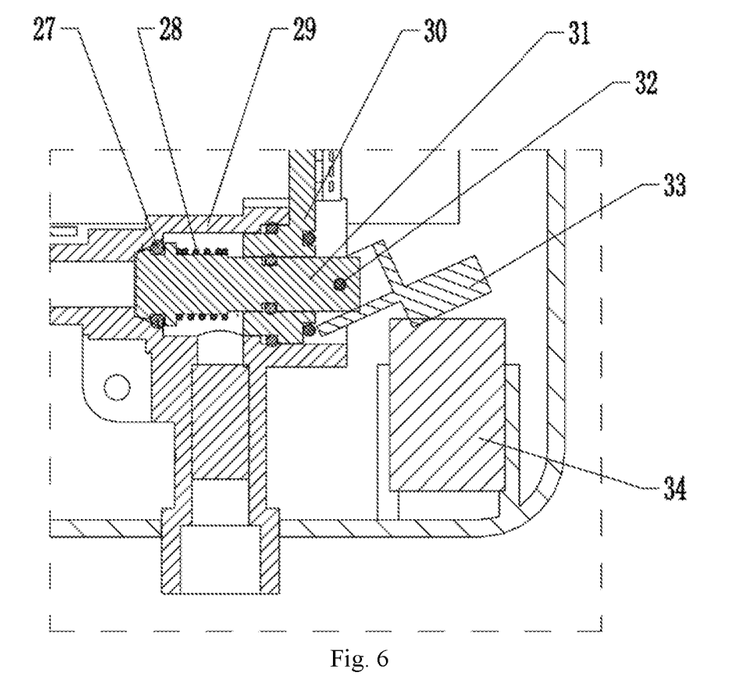
FIG. 6 is a schematic view of the leak-proof mechanism according to an embodiment of the present disclosure, shown with the expansion part unexpanded.

As illustrated in FIG. 6, when the water heater is leaking, the leaking water accumulates at the bottom of the mounting cavity 15, and when the accumulated water reaches a certain amount, the expansion part 34 would be soaked and then expand to drive the revolving part 33 to rotate and separate from the limit part 30. Now the compressed elastic part 28 would drive the moving part 31 to move forward and seal the water inlet of the second water inlet pipe 9 to disconnect the second water inlet pipe 9 from the moving channel 38. That is, now only the first water inlet pipe 10 communicates with the moving channel 38, and the water-containing cavity 6 can't communicate with outside through the second water inlet pipe 9, so that the outside water cannot enter the water-containing cavity 6 anymore.

Figure 3:
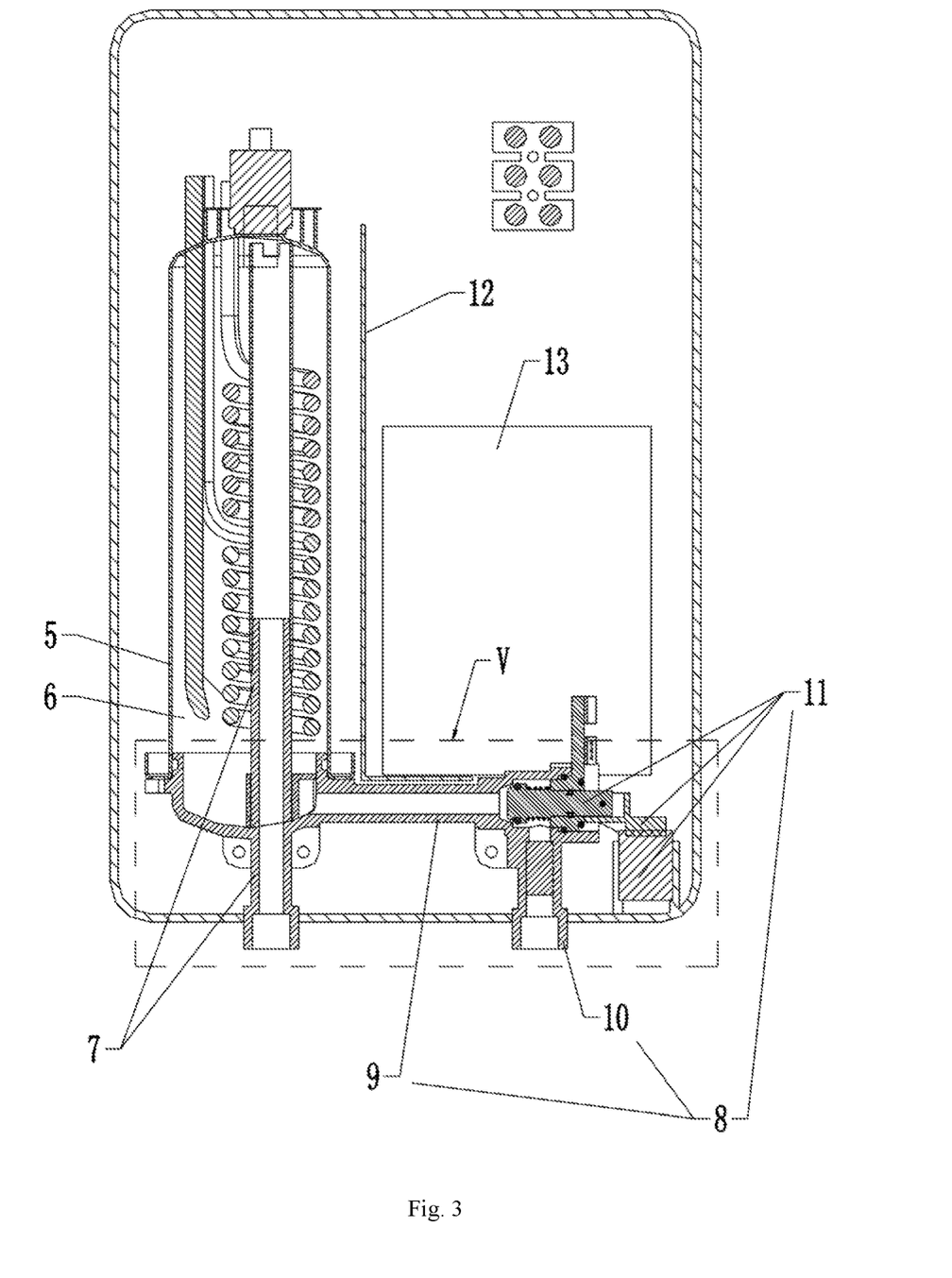
FIG. 3 is a cross-sectional view of the water heater according to an embodiment of the present disclosure, shown with an expansion part unexpanded.
Figure 4:
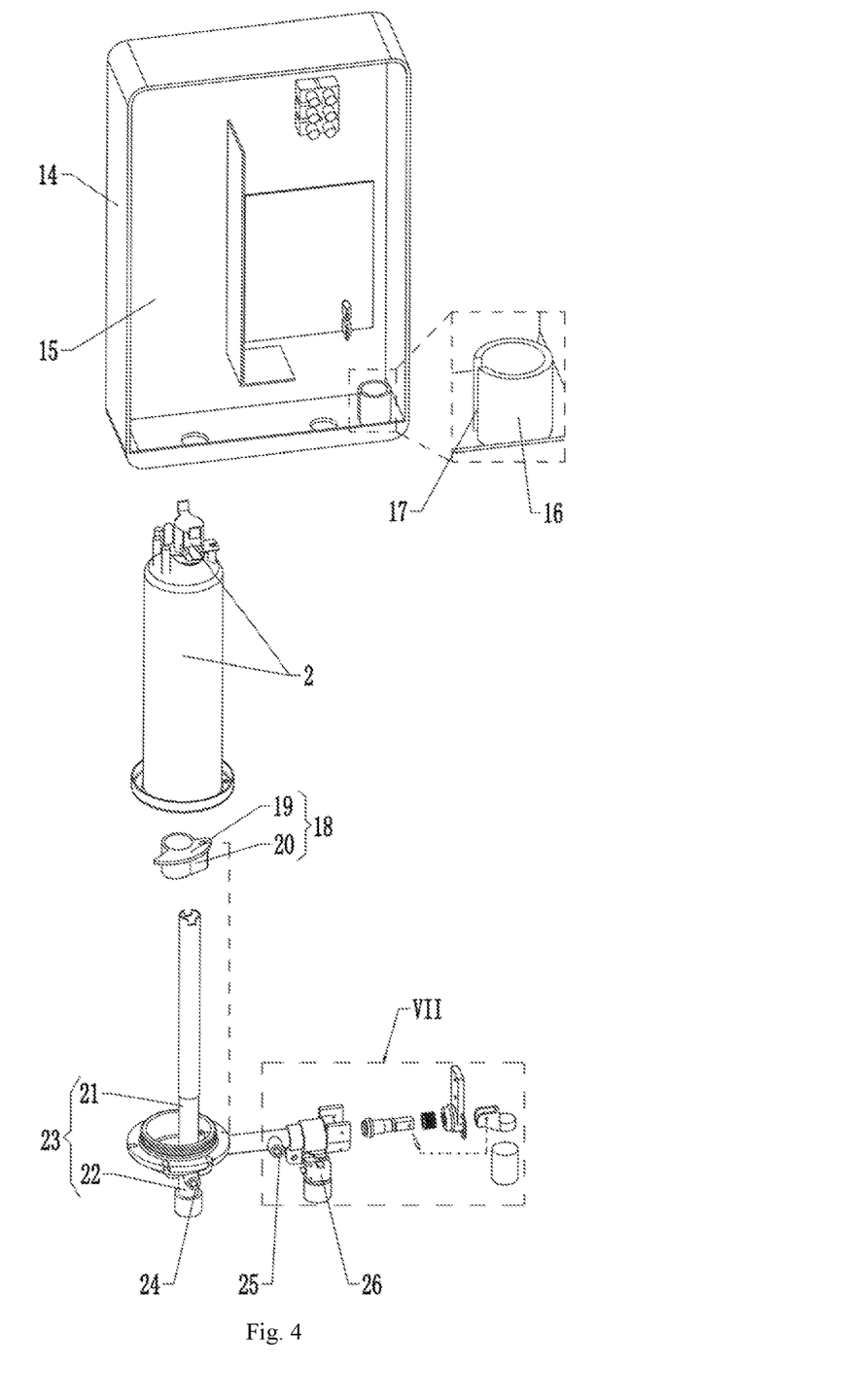
FIG. 4 is an exploded view of the water heater according to an embodiment of the present disclosure.
Figure 7:
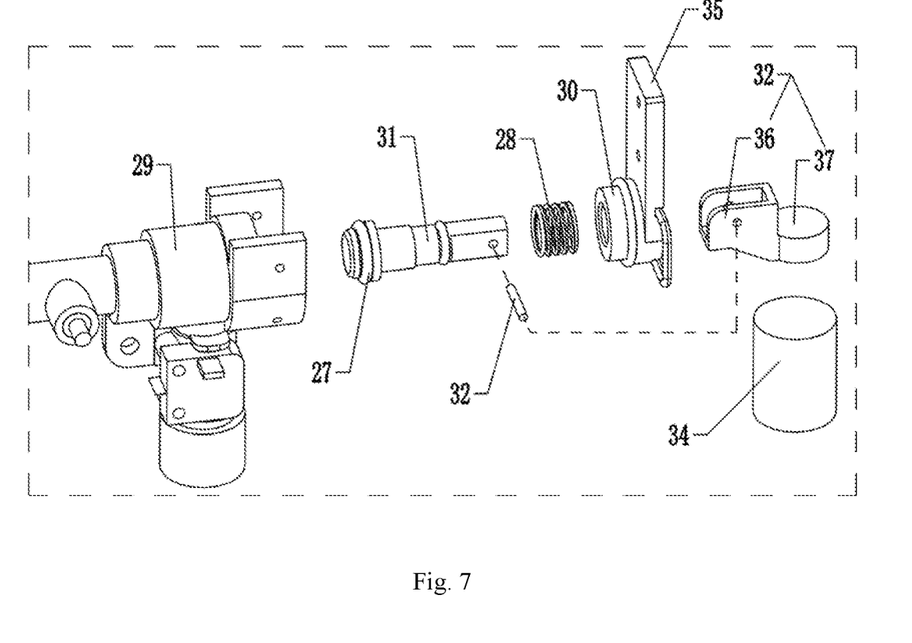
FIG. 7 is a partially enlarged view of selected portion VII shown in FIG. 4.

As illustrated in FIG. 3 and FIG. 7, in the present embodiment, the second water inlet pipe 9 is horizontally arranged at the tube 29 and the first water inlet pipe 10 is vertically arranged at the tube 29. In another embodiment, the first water inlet pipe 10 and the second water inlet pipe 9 can be arranged at the tube 29 at other angles. As illustrated in FIG. 4, in the present embodiment, the housing assembly 1 also comprises a second housing (not shown in figures) disposed at the front end of the first housing 14 to cover the mounting cavity 15.

As illustrated in FIG. 5 to FIG. 7, in the present embodiment, the leak-proof mechanism 11 comprises a rotary axis 32 rotatably disposed at the moving part 31, and the revolving part 33 is arranged at the rotary axis 32.

As illustrated in FIG. 7, in the present embodiment, the revolving part 33 has a limit section 36 used to be supported at the limit part 30, and a driving section 37 connected with the expansion part 34, which can drive the driving section 37 to rotate upwards and lead the limit section 36 to rotate downwards to separate the limit section 36 from the limit part 30, and thus the elastic part 28 can drive the moving part 31 to move forward.

As illustrated in FIG. 4, in the present embodiment, the first housing 14 is provided with a mounting seat 16 which is disposed at the bottom of the mounting cavity 15 and provided with a first channel 17 communicating with the mounting cavity 15, and the expansion part 34 is disposed at the mounting seat 16. Specifically, in the present embodiment, the mounting seat 16 is an annular column, and the first channel 17 is a strip-type gap in the side wall of the column.

As illustrated in FIG. 7, in the present embodiment, the expansion part 34 is cylindrical shape made from polyurethane material. As shown in FIG. 5, the expansion part 34 is disposed at the mounting seat 16, and the height L between the expansion part 34 and the mounting cavity 15 is 5 mm. Specifically, the height L taking suitable values can guarantee that the expansion part 34 doesn't expand due to normal condensation phenomenon of the water heater and expands in time when the water heater is leaking to stop the water heater taking in water. In another embodiment, the height L can take other values such as 3 mm to 10 mm. Furthermore, in another embodiment, the expansion part 34 can be geometry of any other shape made from any other kind of water expandable material, and it won't go into detail here.

In addition, in the present embodiment, the elastic part 28 is a spring. In another embodiment, the elastic part 28 can be an elastomer made from rubber such as a rubber elastic sleeve or an elastic steel sheet.

Figure 1:
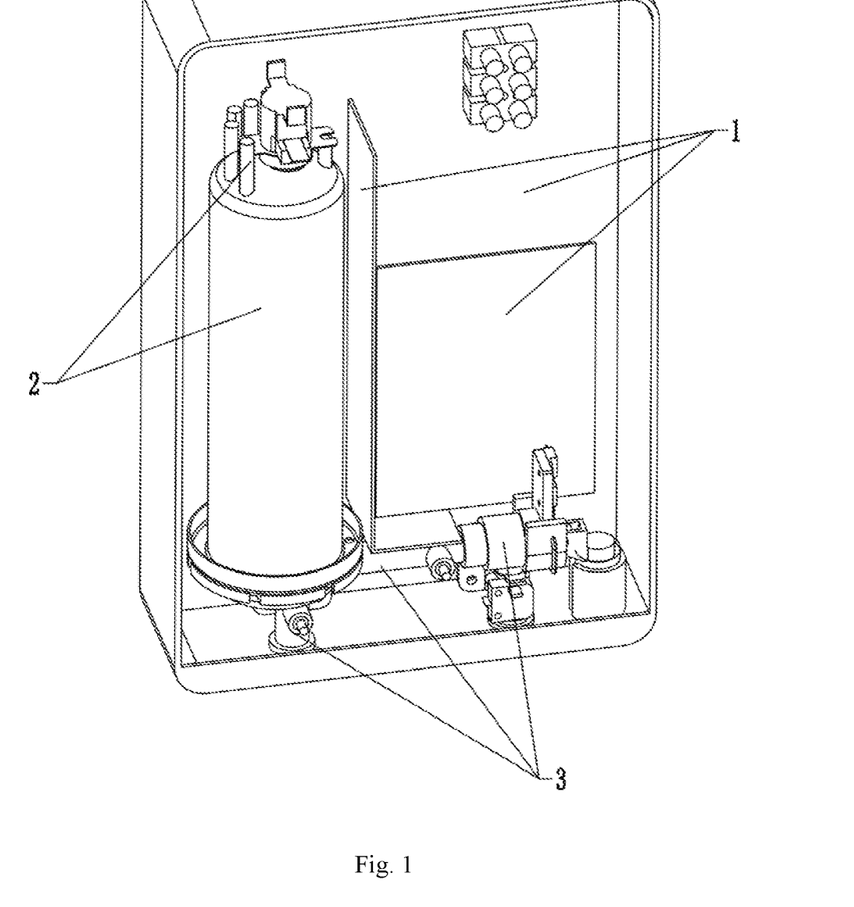
FIG. 1 is an isometric view of the water heater according to an embodiment of the present disclosure.
Figure 2:
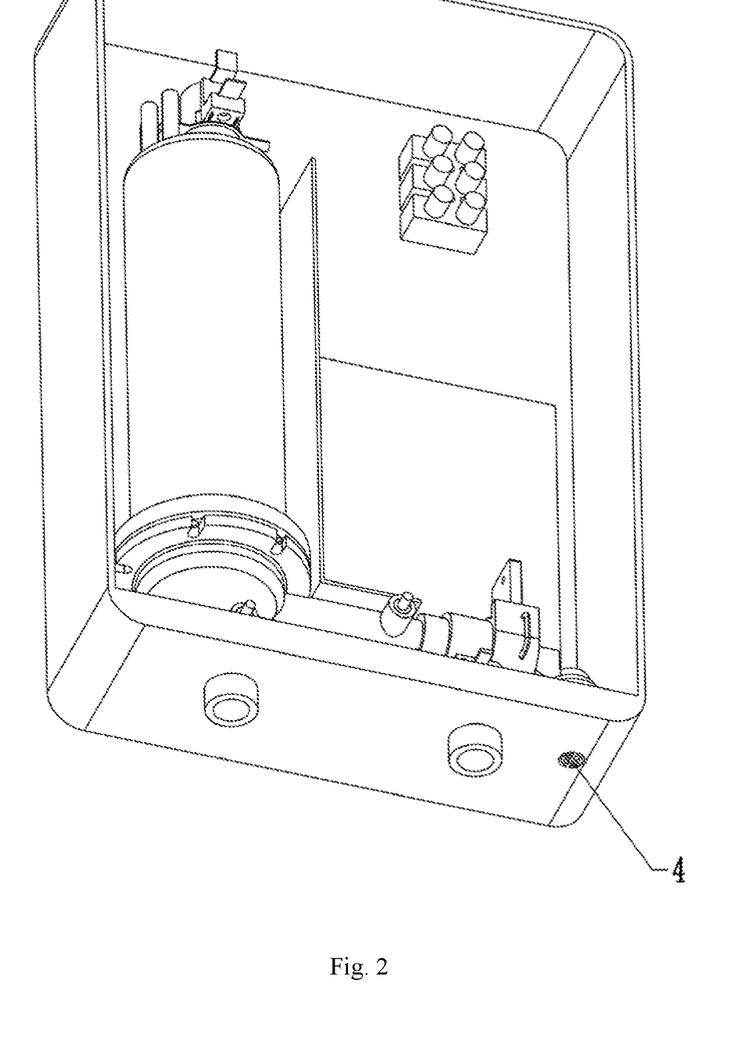
FIG. 2 is another isometric view of the water heater according to an embodiment of the present disclosure.

As illustrated in FIG. 2, in the present embodiment, the first housing 14 is provided with a drainage outlet 4 which is located under the expansion part 34. The drainage outlet 4 can guarantee that the water produced by condensation phenomenon of the water heater will be discharged and will not accumulate in the water-containing cavity 6. Furthermore, as illustrated in FIG. 1, in the present embodiment, only the box assembly 2 and the water inlet and outlet assembly 3 of the water heater allow water to go through, and the water tank 5 is directly disposed at the water inlet and outlet assembly 3 in a unibody construction instead of a multi-section split joint. At the same time, in the present disclosure, the water inlet and outlet assembly 3 is also in a unibody construction. These unibody constructions can greatly reduce the probability of the water heater leaking.

As illustrated in FIG. 5 to FIG. 7, in the present embodiment, the front end of the moving part 31 is sleeved with a first seal 27 which is matched with the water inlet of the second water inlet pipe 9. Specifically, the front end of the moving part 31 has a tapered portion while the water inlet of the second water inlet pipe 9 has a tapered structure matched with the tapered portion. The first seal 27 is sleeved at the tapered portion of the front end of the moving part 31 and can seal the second water inlet pipe 9 when the moving part 31 is driven by the elastic part 28 to be abutted against the water inlet of the second water inlet pipe 9.

As illustrated in FIG. 3 and FIG. 4, in the present embodiment, the water heater comprises a control mechanism comprising a PCB plate 13 located in the mounting cavity 15 and disposed at the first housing 14, a flow sensor 26 and a water inlet temperature sensor 25 disposed at the water inlet subassembly 8, and a water outlet temperature sensor 24 disposed at the water outlet pipe 23. The flow sensor 26 and the water inlet temperature sensor 25 as well as the water outlet temperature sensor 24 are electrically connected with the PCB plate 13.

As illustrated in FIG. 3, the first housing 14 is provided with a division plate 12 to separate the PCB plate 13 from the box assembly 2. In the present embodiment, the division plate 12 is in an L-shape and able to separate the PCB plate 13 from the box assembly 2 to enhance waterproofness of the PCB plate 13. The control mechanism can control the temperature of water heated by the box assembly 2 using existing technologies in the field, and thus will not be discussed here.

As illustrated in FIG. 1 and FIG. 7, the PCB plate 13 has a cooling fin connected with the limit part 30. Specifically, the cooling fin can cool relevant components of the PCB plate 13 through heat transportation thanks to the cooling fin and the limit part 30 connected with the water inlet subassembly 8.

As illustrated in FIG. 3, in the present embodiment, the water outlet pipe 23 has an extended segment 21 which is extended into the water-containing cavity 6 and upwards along the water-containing cavity 6, and a water outlet segment 22 which extends out of the water tank 5. Specifically, the extended segment 21 can guarantee that the heater water entering the water outlet pipe 23 comes from the upper of the water-containing cavity 6, to reduce the amount of scale and other impurities in the water-containing cavity 6 that would enter the water outlet pipe 23 to be discharged.

As illustrated in FIG. 4 and FIG. 5, in the present embodiment, the box assembly 2 comprises a water rotated part 18 disposed in the mounting cavity 15 and located at the water outlet of the second water inlet pipe 9, and the water rotated part 18 has a water rotated blade 19, which is horizontally arranged, and a baffle plate 20 which is vertically arranged. Specifically, in the present embodiment, the water rotated part 18 is sleeved at the extended segment 21 of the water outlet pipe 23 and fixed at the bottom of the water-containing cavity 6. When water from outside enters the water-containing cavity 6 through the first water inlet pipe 10, the leak-proof mechanism 11 and the second water inlet pipe 9 in the S1-direction, because of the limit of the baffle plate 20 and the water rotated part 18, will cause the water to flow along the water rotated part 18 and bypass it in the S1-direction, and gradually enter the water-containing cavity 6 in the form of upward rotation. When the water gradually enters the water-containing cavity 6 in the form of upward rotation, it can clean the scale from the walls of the water-containing cavity 6.

When the water heater is leaking, the water heater of the present disclosure would be disconnected from outside and prevent the outside water from entering the water-containing cavity 6 providing a good leak-proof function. Moreover, the leak-proof mechanism 11 of the present disclosure does not require electric power, and still work well after electric power failure.

All the above are merely the preferred embodiments of the present disclosure, but are not to limit the disclosure in any form. Those skilled in the art may change or modify the above disclosed technical contents to obtain equivalent embodiments without departing from the scope of the present disclosure. The present disclosure is intended to cover all changes, various modifications and equivalent arrangements included within the principle and scope of the present disclosure according to the technical essence of the present disclosure.

What is claimed is:

1. A safe water heater, comprising:
a housing assembly comprising a first housing with a built-in mounting cavity;
a box assembly comprising a water tank located in the mounting cavity with a built-in water-containing cavity; and
a water inlet and outlet assembly comprising a water inlet subassembly and a water outlet subassembly; the water outlet subassembly comprises a water outlet pipe communicating with the water-containing cavity; the water inlet subassembly comprises a second water inlet pipe communicating with the water-containing cavity, a first water inlet pipe is able to communicate with outside, and a leak-proof mechanism communicating with the first water inlet pipe and the second water inlet pipe; the leak-proof mechanism comprising a tube with a built-in moving channel, a moving part movably arranged in the moving channel, a limit part arranged at the tube and sealing one end of the moving channel, an elastic part sleeved at the moving part, a revolving part hinged with the moving part, and an expansion part supported in the mounting cavity;
the revolving part is supportable at the limit part to make the second water inlet pipe and the first water inlet pipe communicate with the moving channel; the expansion part is able to expand in water and drive the revolving part to rotate to make the elastic part drive the moving part to move forward and seal the water inlet of the second water inlet pipe to disconnect the second water inlet pipe from the moving channel.

2. The safe water heater according to claim 1, wherein the revolving part has a limit section used to be supported at the limit part, and a driving section connected with the expansion part to drive the driving section to rotate upwards and lead the limit section to rotate downwards to separate the limit section from the limit part.

3. The safe water heater according to claim 1, wherein the front end of the moving part is sleeved with a first seal matched with the water inlet of the second water inlet pipe.

4. The safe water heater according to claim 1, wherein the first housing is provided with a mounting seat which is disposed at the bottom of the mounting cavity and provided with a first channel communicating with the mounting cavity, and the expansion part is disposed at the mounting seat.

5. The safe water heater according to claim 1, wherein the height between the expansion part and the bottom wall of the mounting cavity is 3 mm to 10 mm.

6. The safe water heater according to claim 1, wherein the first housing is provided with a drainage outlet located under the expansion part.

7. The safe water heater according to claim 1, wherein the water outlet pipe has an extended segment extending into the water-containing cavity and upwards along the water-containing cavity, and a water outlet segment extending out of the water tank.

8. The safe water heater according to claim 1, wherein the box assembly comprises a water rotated part disposed in the mounting cavity and located at the water outlet of the second water inlet pipe, and the water rotated part has a water rotated blade horizontally arranged and a baffle plate vertically arranged.

9. The safe water heater according to claim 1, wherein the water heater comprises a control mechanism comprising a Printed Circuit Board ("PCB") plate located in the mounting cavity and disposed at the first housing, and the first housing is provided with a division plate to separate the PCB plate from the box assembly.

10. The safe water heater according to claim 9, wherein the PCB plate has a cooling fin connected with the limit part; the control mechanism comprises a flow sensor and a water inlet temperature sensor disposed at the water inlet subassembly, and a water outlet temperature sensor disposed at the water outlet pipe; and the flow sensor, the water inlet temperature sensor as well as the water outlet temperature sensor are electrically connected with the PCB plate.

* * * * *